(12) United States Patent
Dwivedi et al.

(10) Patent No.: US 11,443,644 B2
(45) Date of Patent: Sep. 13, 2022

(54) SYSTEM AND METHOD OF GUIDING A PLURALITY OF AGENTS FOR COMPLETE COVERAGE OF AN INSPECTION AREA

(71) Applicant: Wipro Limited, Bangalore (IN)

(72) Inventors: Gyanesh Dwivedi, Bangalore (IN); Vinod Pathangay, Bangalore (IN)

(73) Assignee: Wipro Limited, Bangalore (IN)

( * ) Notice: Subject to any disclaimer, the term of this patent is extended or adjusted under 35 U.S.C. 154(b) by 286 days.

(21) Appl. No.: 16/700,149

(22) Filed: Dec. 2, 2019

(65) Prior Publication Data

US 2021/0110725 A1   Apr. 15, 2021

(30) Foreign Application Priority Data

Oct. 11, 2019 (IN) .............................. 201941041294

(51) Int. Cl.
*G08G 5/00* (2006.01)
*G05D 1/00* (2006.01)
(Continued)

(52) U.S. Cl.
CPC ......... *G08G 5/0069* (2013.01); *B64C 39/024* (2013.01); *G05D 1/0027* (2013.01);
(Continued)

(58) Field of Classification Search
CPC .... G08G 5/0069; G08G 5/0026; G08G 5/045; G08G 5/0034; G08G 5/0043;
(Continued)

(56) References Cited

U.S. PATENT DOCUMENTS 9,104,201 B1   8/2015  Pillai et al.
9,835,453 B2 * 12/2017  Michini .............. G08G 5/0034
(Continued)

FOREIGN PATENT DOCUMENTS

CN   103144770 A   6/2013
WO   2016116841 A1  7/2016
(Continued)

*Primary Examiner* — Kenneth J Malkowski
*Assistant Examiner* — Ibrahim Abdoalatif Alsomairy
(74) *Attorney, Agent, or Firm* — Finnegan, Henderson, Farabow, Garrett & Dunner, LLP

(57) ABSTRACT

Disclosed herein is a system and a method of guiding a plurality of agents 106 for complete coverage of the inspection area 102. The system and the method provide navigational instructions to navigate the plurality of agents 106 across the plurality of signalling unit 104 for traversing the inspection area 102. The plurality of signalling units 104 are communicatively coupled with the multi-agent visual navigation system for transmitting navigational instructions to the plurality of agents 106 based on pass-by information associated with the plurality of agents 106 obtained at the plurality of signalling units 104 and the pre-determined proximity associated with each pair of the plurality of signalling units. The navigational instructions are provided to the plurality of agents 106 at the plurality of signalling units 106 for subsequent navigation of the plurality of agents 106 across the plurality of signalling units 104 for complete coverage of the inspection area 102.

15 Claims, 5 Drawing Sheets

(51) Int. Cl.
*G05D 1/10* (2006.01)
*G05D 1/02* (2020.01)
*B64C 39/02* (2006.01)

(52) U.S. Cl.
CPC ........... *G05D 1/0202* (2013.01); *G05D 1/104* (2013.01); *G08G 5/0026* (2013.01); *B64C 2201/143* (2013.01); *G05D 2201/0207* (2013.01)

(58) Field of Classification Search
CPC .... G08G 5/006; G08G 5/0013; G05D 1/0027; G05D 1/104; G05D 1/0202; G05D 2201/0207; G05D 1/0297; B64C 39/024; B64C 2201/143; B64C 2201/127; B64C 2201/123
See application file for complete search history.

(56) References Cited

U.S. PATENT DOCUMENTS

| | | | | |
|---|---|---|---|---|
| 10,126,135 | B2 * | 11/2018 | Mortazavi | G08G 1/096716 |
| 10,522,047 | B2 * | 12/2019 | Giusti | G08G 5/0013 |
| 2017/0140655 | A1 | 5/2017 | Erickson et al. | |
| 2018/0231972 | A1 * | 8/2018 | Woon | G05D 1/0808 |
| 2018/0246529 | A1 * | 8/2018 | Hu | G05D 1/0038 |
| 2020/0244890 | A1 * | 7/2020 | Peters | G06K 9/00657 |
| 2020/0391384 | A1 * | 12/2020 | Cohen | G05D 1/0274 |

FOREIGN PATENT DOCUMENTS

| | | |
|---|---|---|
| WO | 2018084104 A1 | 5/2018 |
| WO | 2019069876 A2 | 4/2019 |

\* cited by examiner

SYSTEM AND METHOD OF GUIDING A PLURALITY OF AGENTS FOR COMPLETE COVERAGE OF AN INSPECTION AREA

TECHNICAL FIELD

The present subject matter is, in general, related to navigating multiple automated agents for inspecting an area and more particularly, but not exclusively, to a method and system of guiding a plurality of agents for complete coverage of an inspection area.

BACKGROUND

Inspection or coverage of an indoor area such as data centers, warehouses, retail stores, factory floor, is needed to be performed periodically. Various inspection activities require professional skills for completing tasks accurately and efficiently, however it is a time-consuming process. In order to reduce labour cost, use of robotic devices and drones has now become a preferable technique for automated inspection of indoor areas within a short time span and with less human intervention. A number of techniques have been proposed to achieve accuracy and effectiveness for the inspection and coverage of an indoor area.

Starting with navigating a robotic device in an unknown or an unstructured environment, there are techniques for controlling robotic devices for coordinated navigation and surveillance, such as SLAM (Simultaneous Location And Mapping) that are popularly known in robotics and automation industries. However, for large areas using a single drone to traverse a programmed path may not be feasible due to limitation in battery capacity and the length of time taken for inspection by a single drone. A multiple drones based approach for outdoor area using WiFi or GPS based localization mechanisms for localization and navigation is known. But these solutions are not suitable for indoor spaces such as warehouses and retail stores where GPS or Wireless connection is not reliable, Apart from indoor spaces that are GPS-denied, there are scenarios in outdoor environments where GPS signals or cellular network are not strong due to occlusions.

Hence there is need for efficient and timely inspection of low-network coverage environments.

The information disclosed in the background section of the disclosure is only for enhancement of understanding of the general background of the invention, and should not be taken as an acknowledgement or any form of suggestion that this information forms the prior art already known to a person skilled in the art.

SUMMARY

A method of guiding a plurality of agents for complete coverage of an inspection area is disclosed. The method may include providing first navigational instructions to the plurality of agents to reach a corresponding signalling unit of a plurality of signalling units associated with the inspection area. Upon reaching the corresponding signalling unit by an agent of the plurality of agents, the method may further include recording pass-by information associated with the agent at the corresponding signalling unit of the plurality of signalling units. The method may further include determining second navigational instructions for the agent of the plurality of agents to traverse a proximal signalling unit of the plurality of signalling units for complete coverage of the inspection area. The step of determining the second navigational instructions for the agent includes predicting the proximal signalling unit to be traversed by the agent based on pass-by information associated with the plurality of agents obtained at the plurality of signalling units and a pre-determined proximity associated with each pair of the plurality of signalling units. The method may further include providing the second navigational instructions to the plurality of agents at the corresponding signalling unit for subsequent traversal of each of the proximal signalling units of the plurality of signalling units by at least one agent of the plurality of agents for complete coverage of the inspection area.

In one embodiment, a multi-agent visual navigation system for guiding a plurality of agents for complete coverage of an inspection area is disclosed. In one example, the multi-agent navigation system includes a plurality of signalling units configured with signal display, a memory and at least one processor. The memory is communicatively coupled with the at least one processor and stores instructions, which on execution causes the at least one processor to provide first navigational instructions to the plurality of agents to reach a corresponding signalling unit of a plurality of signalling units associated with the inspection area. Upon reaching the corresponding signalling unit by an agent of the plurality of agents, the processor-executable instructions, on execution, may further cause the at least one processor to record pass-by information associated with the agent at the corresponding signalling unit of the plurality of signalling units. The processor-executable instructions, on execution, may further cause the at least one processor to determine second navigational instructions for the agent of the plurality of agents to traverse a proximal signalling unit of the plurality of signalling units for complete coverage of the inspection area. The processor-executable instructions for determining the second navigational instructions for the agent causes the at least one processor to predict the proximal signalling unit to be traversed by the agent based on pass-by information associated with the plurality of agents obtained at the plurality of signalling units and a pre-determined proximity associated with each pair of the plurality of signalling units. The processor-executable instructions, on execution, may further cause the at least one processor to provide the second navigational instructions to the plurality of agents at the corresponding signalling unit for subsequent traversal of each of the proximal signalling units of the plurality of signalling units by at least one agent of the plurality of agents for complete coverage of the inspection area.

In another embodiment, the present disclosure relates to a non-transitory computer readable medium storing processor-executable instructions for guiding a plurality of agents for complete coverage of an inspection area is disclosed. In one example, the stored instructions, when executed by a processor, may cause the processor to perform operations including providing first navigational instructions to the plurality of agents to reach a corresponding signalling unit of a plurality of signalling units associated with the inspection area. The operations may further include recording pass-by information associated with the agent at the corresponding signalling unit of the plurality of signalling units upon reaching the corresponding signalling unit by an agent of the plurality of agents. The operations may further include determining second navigational instructions for the agent of the plurality of agents to traverse a proximal signalling unit of the plurality of signalling units. The stored instructions for determining the second navigational instructions for the agent causes the at least one processor to perform the operations including predicting the proximal signalling unit to be traversed by the agent based on pass-by information associated with the plurality of agents obtained at the plurality of signalling units and a pre-determined proximity associated with each pair of the plurality of signalling units. The operations may further include providing the second navigational instructions to the plurality of agents at the corresponding signalling unit for subsequent traversal of each of the proximal signalling units of the plurality of signalling units by at least one agent of the plurality of agents.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
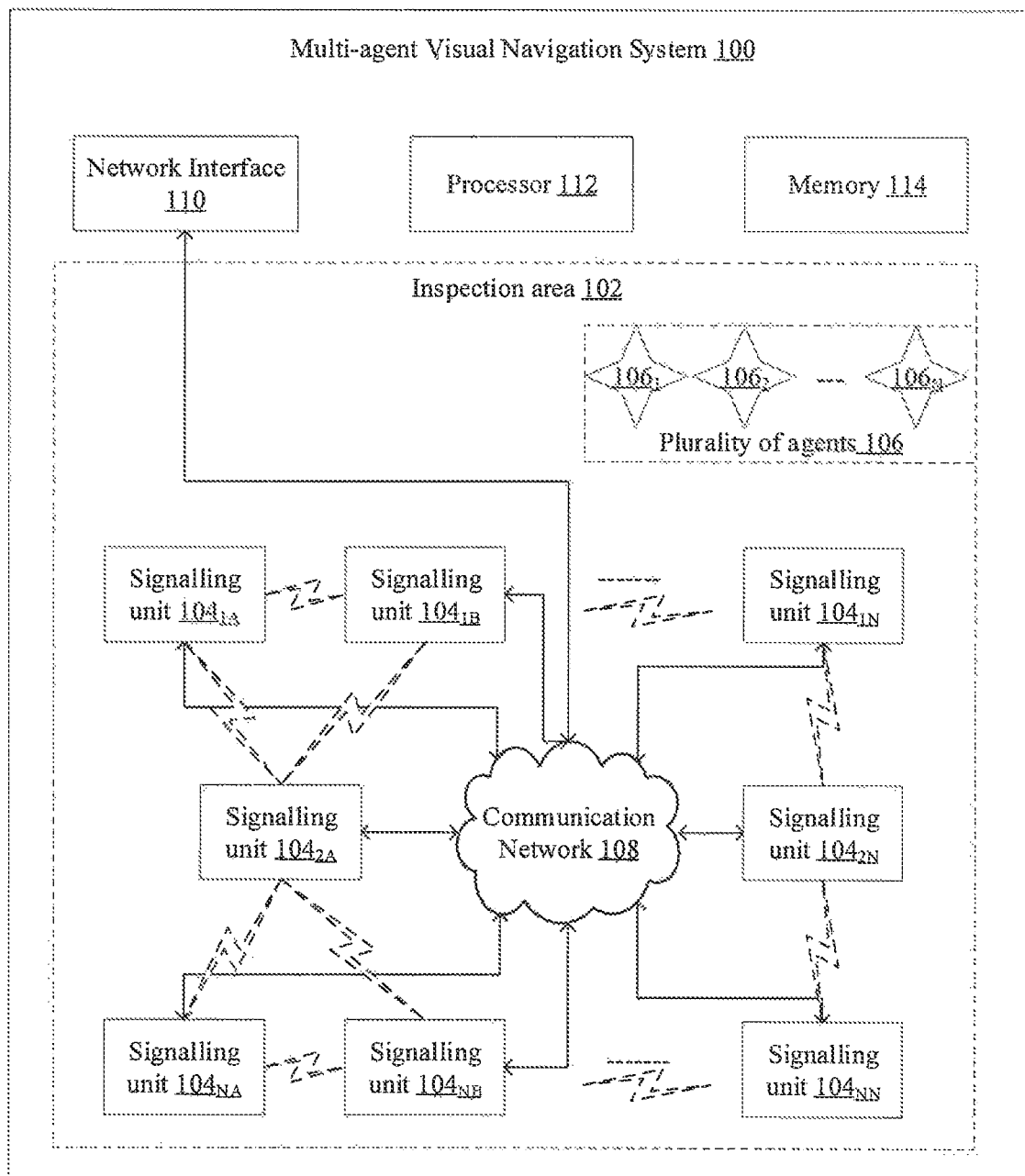
FIG. 1 illustrates a block diagram of a multi-agent visual navigation system for guiding a plurality of agents for complete coverage of an inspection area in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes, which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises, a" does not, without more constraints, preclude the existence of other elements or additional elements in the system or method.

The present disclosure proposes a system and a method of guiding a plurality of agents in an inspection area. The inspection area may include a plurality of signalling units that covers the entire inspection area and provides a variable layout with adjustable positioning of the plurality of signalling units. In an embodiment, the plurality of signalling units are configured to provide navigation to the plurality of agents for complete coverage of the inspection area. In an embodiment, the plurality of agents may be configured with one or more cameras and an on-board processor to process the received navigational instructions for traversing across the plurality of signalling units associated with the inspection area. In some embodiments, the system may include a distributed system wherein the plurality of signalling units are capable of receiving, transmitting and processing the navigational instructions for the plurality of agents for traversing across the plurality of signalling units. In some embodiments, the system may be a centralized framework for determining navigational instructions for the plurality of agents based on exchange of data between the plurality of agents and the plurality of signalling units. The proposed system and the method ensures coordinated dynamic navigation of the plurality of agents for traversal of the plurality of signalling units for complete coverage of the inspection area.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates a block diagram of a multi-agent visual navigation system 100 for guiding a plurality of agents for complete coverage of an inspection area 102 in accordance with some embodiments of the present disclosure. In some embodiments, the inspection area 102 may include a plurality of signalling units such as signalling unit $104_{1A}$ to signalling unit $104_{NN}$ (collectively referred as signalling units 104) associated with the inspection area 102, a plurality of agents such as agent $106_1$ to agent $106_N$ (collectively referred as agents 106), and a communication network 108. The plurality of signalling units 104 are communicatively coupled with the multi-agent visual navigation System 100 through the communication network 108.

In an embodiment, the multi-agent visual navigation system 100 may be a centralized framework connecting the plurality of signalling units 104 (hereinafter referred to as signalling units 104) associated with the inspection area through the communication network 108 to a centralized server (not shown in FIG. 1). In other words, the signalling units 104 may exchange data with the centralized server for processing through the communication network 108. In another embodiment, the multi-agent visual navigation system 100 may be configured as a distributed framework wherein the signalling units 104 are communicatively coupled with each other through the communication network 108, and wherein the data exchanged between the signalling units 104 and the data exchanged between a particular signalling unit and one of the agents 106 may be processed individually by each signalling unit. The multi-agent visual navigation system 100 may include a network interface 110, at least one processor 112, and a memory 114. The memory 114 may include various modules (not shown in FIG. 1) that may store instructions that, when executed by the at least one processor 112, cause the at least one processor 112 to perform functions to guide the plurality of agents 106 in the inspection area 102, in accordance with some embodiments of the present disclosure. The memory 114 may also store various data that may be captured, processed, and/or required by multi-agent visual navigation system 100 for guiding the plurality of agents 106 in the inspection area 102. The communication network 108 may be a wired network, a wireless network, a radio frequency network or the like.

The inspection area 102 may be any area such as storage areas, parking areas, warehouses, basement, under-construction buildings and the like that may require inspection of the area with minimal human intervention in a timely and cost-effective manner. In an exemplary scenario, the inspection area may be underground mines where the plurality of agents can be used to check for presence of personnel, equipment, water leakage, fire hazards, etc. and help in evacuation in cases of emergency. Another scenario may include survey of the inspection area by using remote signalling units that can coordinate the plurality of agents for fast inspection.

The communication network 108 may be a wired network or an ad-hoc wireless network. In some embodiments, the multi-agent visual navigation system 100 may be connected with the signalling units 104 through the wired network to establish a centralized framework. In some embodiments, the wired network may include one or more network interfaces 110 installed at one or more dedicated locations such as floor, walls, or hanging nodes from the ceiling of the inspection area 102. In such embodiment, the signalling units 104 may be placed adjoining the one or more dedicated locations to establish a secure connection with the multi-agent visual navigation system 100. In some embodiments, the inspection area may have the ad-hoc wireless network, which may include a wireless connection consisting of multiple mobile nodes, such as the signalling units 104 that may be placed at the one or more dedicated locations to configure a secure connection between each pair of signalling units for sending and receiving data. In some embodiments, the signalling units 104 are connected together in distributed framework in the form of a single connected graph (explained below in conjunction with FIG. 3). The ad-hoc wireless network is dynamic and random in nature and is based on relative location of the signalling units 104 to establish wireless communication network within the inspection area 102 without relying on GPS (Global Positioning System).

In some embodiments, the signalling units 104 associated with the inspection area 102 may include signal receiving units and transmitting units which are configured to communicate with the plurality of agents 106. The signalling units 104 enable the multi-agent visual navigation system 100 to communicate and guide the plurality of agents 106 across the inspection area 102 through the signalling units 104. In some embodiments, the signalling units 104 may include a display unit for providing navigational instructions to the plurality of agents 106. In some embodiments, the signalling units may determine first and/or second navigational instructions for the plurality of agents to traverse in the inspection area. In case of distributed framework, the first navigational instructions may be determined and provided to each of the plurality of agents 106 one-by-one by the first signalling unit (acting as a root signalling unit) based on the position of the signalling units. The first navigational instructions guide the plurality of agents to reach at least one signalling unit nearby, wherein each agent may be guided a designated signalling unit. Thereafter, the second navigational instructions may be determined by the signalling units, when the agents reach the designated signalling unit, based on the pass-by information received for each of the agents, and provided to the agents by the designated signalling unit. In case of centralized framework, a navigation broadcasting module of the multi-agent visual navigation system provides first navigational instructions to the plurality of agents based on the position of the signalling units to reach a designated signalling unit. The second navigational instructions are provided to the agents by the multi-agent visual navigation system 100, upon receiving the pass-by information associated with the agents by the designated signalling units, and determining second navigational instructions for the agents to be provided at the designated signalling unit.

In some embodiments, the signalling units 104 may be mounted on the walls, pillars, racks, or hanged from the ceiling in the inspection area 102. The deployment of signalling units 104 is so configured to establish connection through the communication network 108 using one or more network interfaces associated with signalling units. Without the need of fixed infrastructure, the signalling units 104 can be deployed by any personnel by physically mounting it in the inspection area 102. In some embodiments, the signalling units may be deployed in such a manner that it can be moved from a current location and placed at other locations to provide a variable layout in the inspection area 102.

In some embodiments, while deploying the signalling units in the inspection area 102, the signalling units 104 may be placed at one or more dedicated locations for establishing communication as well as power connectivity through the wired network. In some embodiments, the signalling units 104 when deployed with long life batteries, which can wake-up on receiving sensor data in an instance of arrival of an agent nearby and the like, may be detachably connected through the communication network 108 without dedicated wired connection. During deployment of the signalling units for the ad-hoc wireless network, the signalling units 104 may be physically moved for installation to the one or more dedicated locations in the inspection area 102. At this step, a signalling unit is powered on and set to 'deploy mode'. In some embodiments, if the signalling unit is a first signalling unit, for example $104_{1,4}$, it can be marked as root signalling unit. Thereafter, the placement of other signalling units is performed wherein each signalling unit scans one or more signals received from other signalling units while placing it nearby to create a local proximity list. The signalling units 104 may be placed in a row in a linear manner (A-N), forming a set of consecutive rows (1-N) to cover the inspection area 102. After the first signalling unit is installed, the second signalling unit, which is to be placed adjacent to the first signalling unit for example second signalling unit may be signalling unit 1041B or signalling unit $104_{2A}$ when placing nearby first signalling unit i.e. signalling unit $104_{1A}$, may provide feedback to the personnel to install second signalling unit at the one or more dedicated locations where communication between each pair of signalling units is established. The proximity-updating module, shown in FIG. 3, of the signalling unit is configured to create local proximity list for each signalling unit. The local proximity list for each signalling unit may include adjacency information of the proximal signalling units to each signalling unit, and relative distance between each signalling unit and the proximal signalling units. The local proximity list associated with each signalling unit is aggregated to determine proximity information between each pair of signalling units. The pre-determined proximity information associated with each pair of signalling units may be used to illustrate a single connected graph of the signalling units 104 deployed in the inspection area.

In an embodiment, the signalling units 104 may use any of the visible or audible indicators to guide the personnel performing installation to physically move the signalling units 104 to the one or more dedicated locations. To estimate the one or more dedicated locations for ad-hoc wireless network, distance and angle for proximity between the two signalling units may be calculated by using localization or triangulation techniques known in the art such as received signal strength (RSSI) measurements, time-of-arrival, time-difference of arrival measurements (ToA, TDoA), Angle-of-arrival (AoA) measurements. Upon successful deployment of the signalling units 104, the communication network 108 connecting each of the signalling units may be established for the multi-agent visual navigation system 100.

The plurality of agents 106 may include aerial devices and/or robotic agents, which are capable of autonomously moving and/or navigating within the inspection area 102, The plurality of agents 106 may be placed at a docking station or a home station in the inspection area 102 before the navigation starts. In some embodiments, the plurality of agents 106 may be configured to communicate with the signalling units 104 using wireless communication network. In some embodiments, the plurality of agents may include an on-board processor for receiving and processing navigational instructions provided by the signalling units 104, as will be explained in detail in conjunction with FIG. 2. The plurality of agents 106 may further include a collision avoidance mechanism for controlling the movement of an agent when it come across any obstacle, or another agents in the vicinity.

Figure 2:
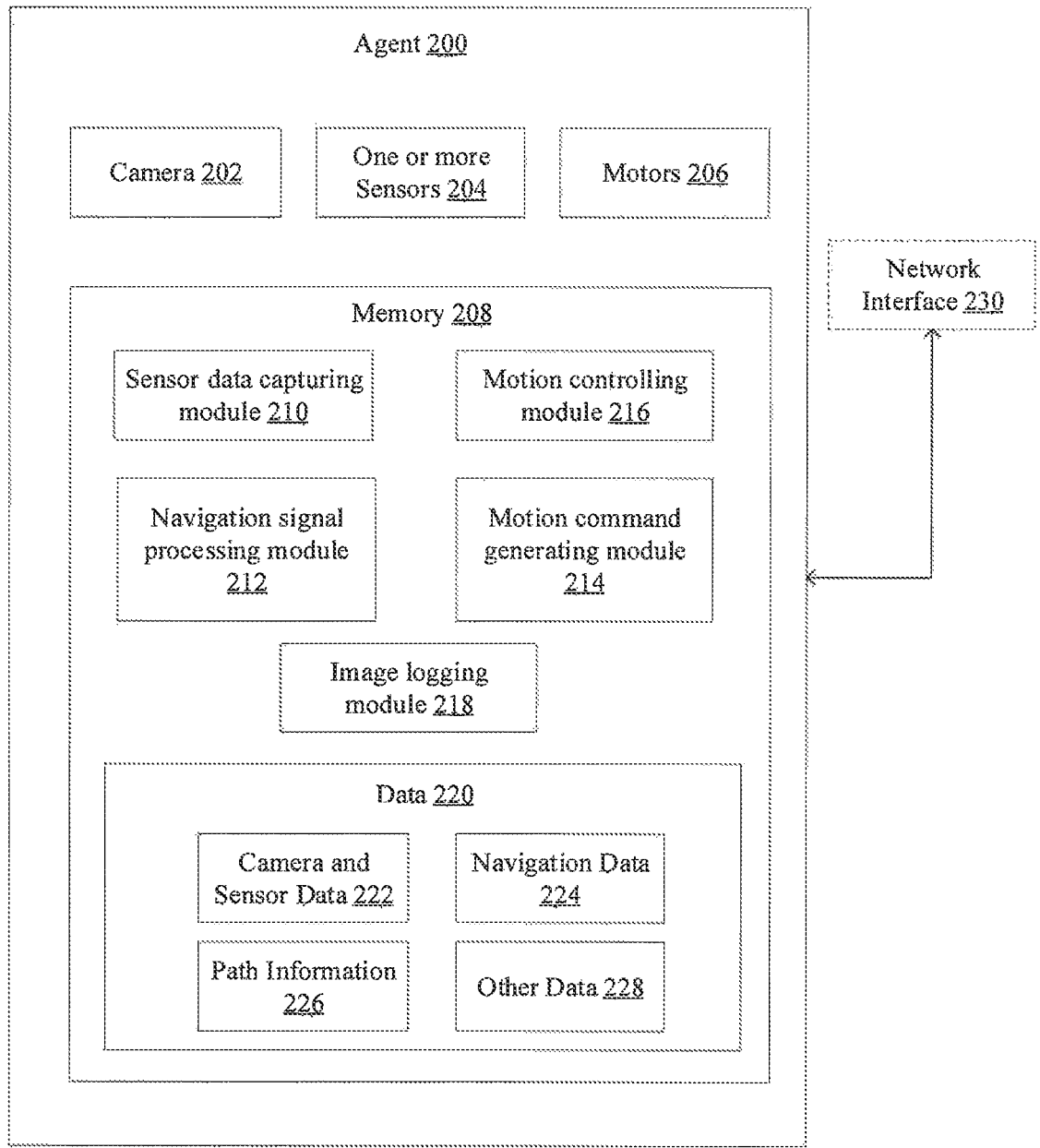
FIG. 2 illustrates a block diagram for an agent of a plurality of agents in accordance with some embodiments of the present disclosure.

Referring now to FIG. 2, which illustrates a block diagram for an agent 200 of the plurality of agents 106 in accordance with some embodiments of the present disclosure. The agent 200 may include a camera 202 for capturing images of various locations for creating an overall view of inspection area. Further, the agent 200 may include one or more sensors 204 such as Light Detection and Ranging Sensor (LIDAR), Inertial Measurements Unit (IMU), barometer, height sensor, proximity sensor and the like. Agent 200 may also include a memory 208 which may include various modules such as a sensor data capturing module 210, a navigation signal processing module 212, motion command generating module 214, motion controlling module 216, and image logging module 218, and data 220 required by the agent 200 for on-board processing. The sensor data capturing module 210 may capture data associated with the camera 202 and the one or more sensors 204. The navigation signal processing module 212, may receive the one or more image frames from the sensor data capturing module 210. Here, the image frames may correspond to visual instructions provided by the signalling units and may include, for example, digital codes, QR codes, Aruco markers, and the like. While in motion, the camera 202 of the agent 200 may look for the signalling units which are displaying image frames, Agent 200 may capture the image frames and decode visual instructions to determine movement of the agent 200.

Agent 200 may further include motion command generating module 214 and motion controlling module 216 for operating one or more motors 206 in the agent based on high-level motion command and low-level motor control command provided by the navigation signal processing module 212 for controlling the movement of the agent 200. For example, a high-level motion command "move-up by 0.4 m" will be executed as motion control commands by a controller that will increment the propeller speeds by, for example, 102 rpm till the height is increased by 0.4 m and then return the speed back to the original speed. This is done using a closed loop control logic that uses the height sensor to verify if the target height is reached. Similarly, other commands such as rotation will use the IMU, accelerometer, gyroscope, magnetometer and the like to execute motion control in a closed loop. Further, the agent 200 may include image logging module 218 that aggregates the one or more image frames for creating a panoramic or mosaic view of the inspection area based on navigation of the plurality of agents 106 in the inspection area 102.

Camera and sensor data 222 received from the camera 202 and the one or more sensors 204 may be stored in the memory 208 of the agent 200. Camera and sensor data 222 includes sensor data that is required by the agent for generating motion command of the agent 200 during movement. It further includes navigation data 224, which will be used by the agent 200 for determining path based on the first and/or second navigational instructions received from the signalling units 104. The agent 200 also stores path information 226 in the memory 208, which provides navigational history and previously traversed path of the agent 200 between the docking station and the current signalling unit. A subset of the other data 228, which is required for the navigation of the agent 200 is collected and stored in the memory 208 of the agent 200. In some embodiments, the agent 200 may include network interface 230 to communicate with the signalling units for receiving navigational instructions to traverse in the inspection area 102.

Figure 3:
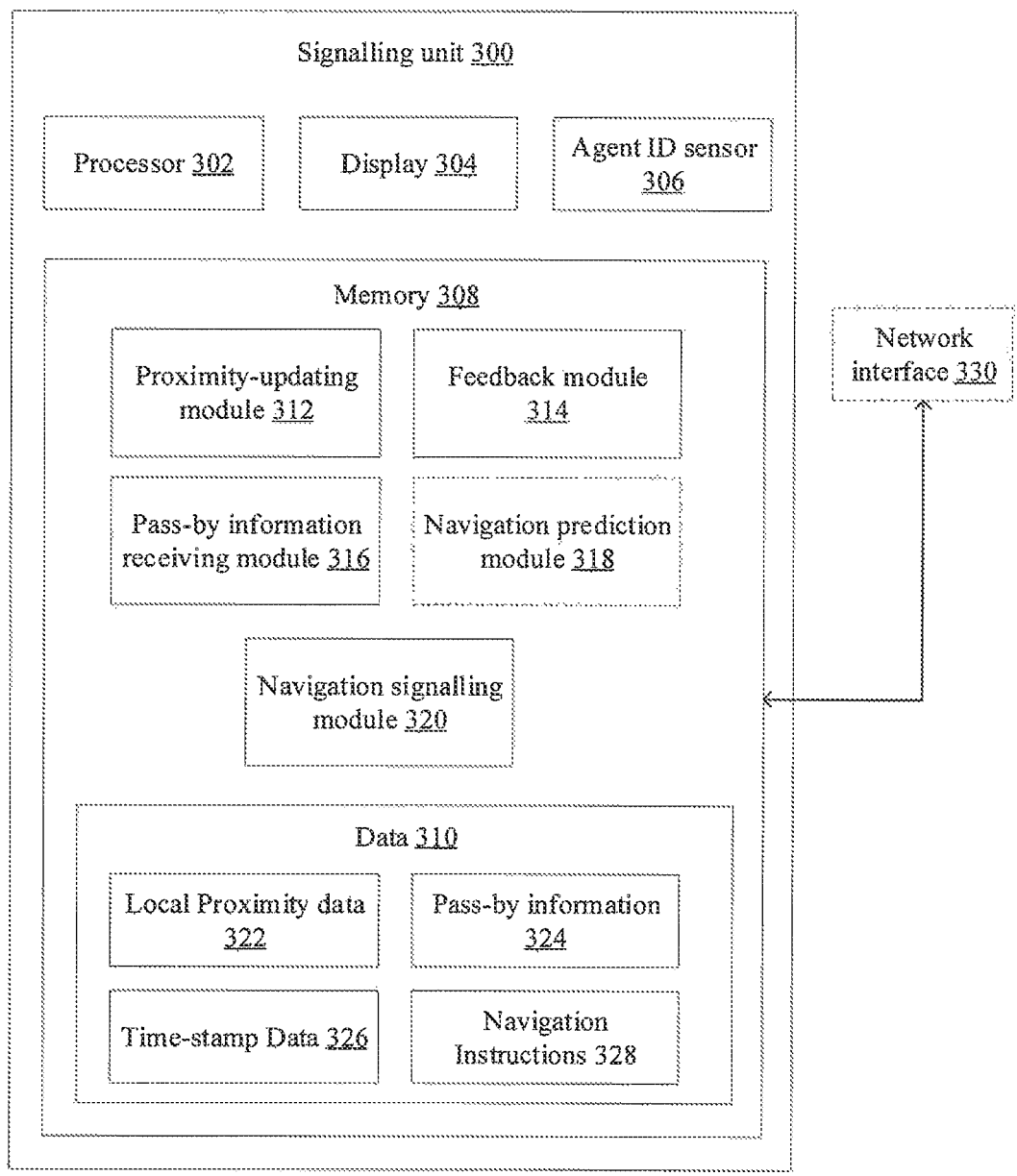
FIG. 3 illustrates a block diagram for a signalling unit of the plurality of signalling units in accordance with some embodiments of the present disclosure.

FIG. 3 illustrates a block diagram for a signalling unit 300 of the plurality of signalling units in accordance with some embodiments of the present disclosure. In an embodiment, each signalling unit 300 may include a processor 302, a display 304, agent ID sensor 306, a memory 308, and a network interface 330. The signalling unit 300 may work in at least two modes, including a deployment mode in which the signalling unit is being installed by a personnel, and a navigational mode while navigating the plurality of agents in the inspection area. While in deployment mode, the signalling unit 300 may include a proximity-updating module 312 for updating local proximity list and a feedback module 314 for providing signal feedback to the personnel. While in navigational mode, the signalling unit 300 may include a pass-by information receiving module 316 for receiving pass-by information associated with the plurality of agents and a navigation signalling module 320 for providing first and/or second navigational instructions to the plurality of agents. In some embodiments, the signalling unit 300 may include a navigation prediction module 318 for determining first and/or second navigational instructions for the plurality of agents to traverse in the inspection area. It is to be noted that although the navigation prediction module 318 is illustrated within the signalling unit 300, in some embodiments, the navigation prediction module 318 may reside in a centralized server. In this case, the centralized server may receive pass-by information from each of the signalling units based on which navigational instructions for the various agents may be determined. The signalling unit 300 may store data 310 in the memory 308, which may include local proximity data 322 associated with the signalling unit, pass-by information 324 associated with the various agents traversing through the signalling unit, time-stamp data 326 for the traversal, and navigation instructions 328 for the plurality of agents.

The signalling unit 300 may include the display 304 for displaying first and/or second navigational instructions to the plurality of agents in the form of visual instructions, such as a digital code, a QR code, an Aruco marker and the like.

Figure 4:
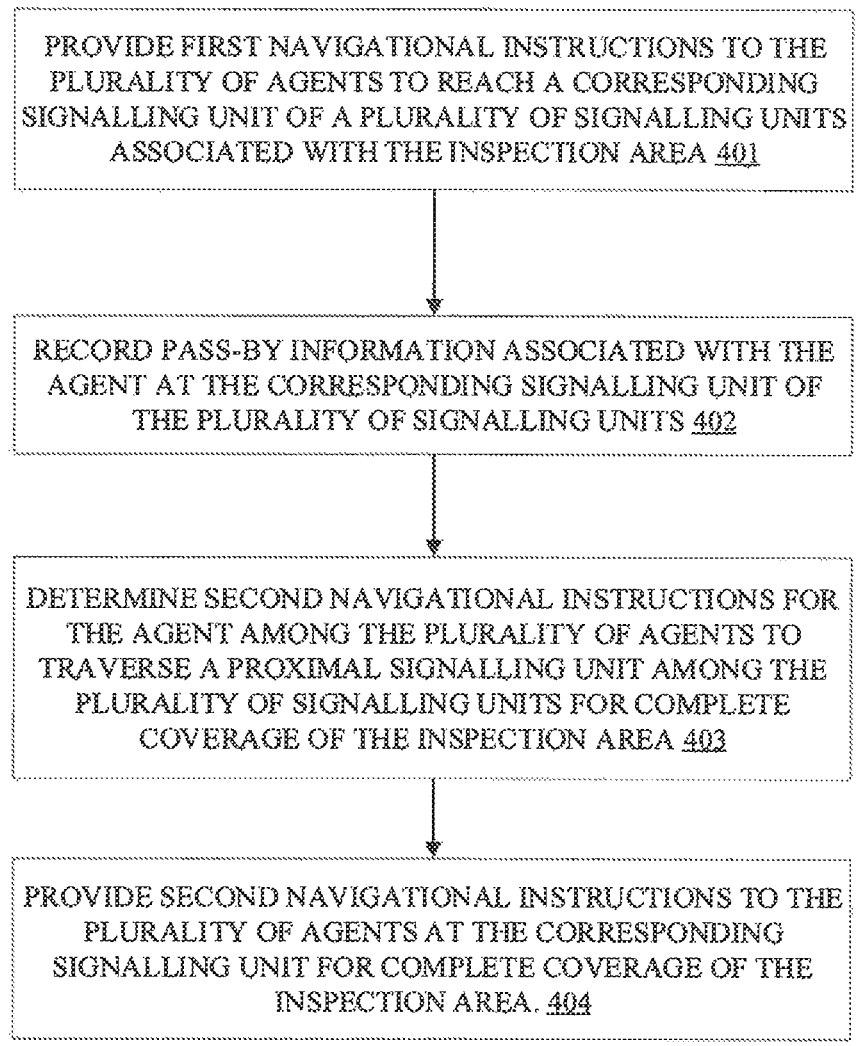
FIG. 4 shows a flowchart illustrating a method of guiding a plurality of agents for complete coverage of an inspection area in accordance with some embodiments of the present disclosure.

FIG. 4 shows a flowchart illustrating a method of guiding a plurality of agents such as agents 106 of FIG. 1 for complete coverage of the inspection area in accordance with some embodiments of the present disclosure. The plurality of agents may be positioned at the home station in the inspection area before the navigation is started as explained in conjunction with FIG. 1.

At step 401, the multi-agent visual navigation system 100 may provide first navigational instructions to the plurality of agents 106 to reach a corresponding signalling unit of the signalling units 104 associated with the inspection area 102. The first navigational instructions may be determined for each agent of the plurality of agents 106 placed at the home station to maximize initial coverage of the signalling units 104. The first navigational instructions are determined for the plurality of agents 106 to provide initial navigation to reach a corresponding signalling unit of the signalling units 104. Here, each of the plurality of agents may be directed to one of the plurality of signalling units based on the first navigational instructions. The signalling unit to which a particular agent is navigated may be termed a corresponding signalling unit for that particular agent. In this way, each agent may be associated with its own corresponding signalling unit based on the first navigational instructions. The number of agents, the number of signalling units and a pre-determined proximity associated with each pair of the signalling units may be analysed to provide maximal initial coverage of the signalling units by the plurality of agents.

The multi-agent visual navigation system 100 while connected in a centralized framework includes the centralized server to determine the one or more dedicated locations of the signalling units 104, and to determine first and second navigational instructions for the plurality of agents. In case of distributed framework, the multi-agent navigation system may operate through each of the signalling units distributed at the one or more dedicated locations in the inspection area 102. The signalling units may be communicatively coupled to each other to create an ad-hoc distributed framework for guiding the plurality of agents in the inspection area. The first navigational instructions may be provided to each agent when positioned at the docking station to reach a corresponding signalling unit, whereas the second navigational instructions may be provided to the agent upon reaching the corresponding signalling unit designated as per the navigational instructions provided to the agent. The centralized server determines second navigational instructions for each agent upon reaching the corresponding signalling unit, based on the first navigational instructions provided to the agent and the position of the signalling units. In case of the distributed framework, the signalling units determine first and second navigational instructions for the plurality of agents based on the pass-by information associated with the plurality of agents and the pre-determined proximity information associated with each pair of the signalling units. The second navigational instructions may be dynamically determined for each of the plurality of agents for each traversal of the designated signalling units, based on the pre-determined proximity information associated with each pair of the signalling units and the navigational instructions previously received by the agent.

In an embodiment, a graph traversal algorithm such as A* algorithm may be used to determine the first navigational instructions for the plurality of agents positioned at the home station to reach a corresponding signalling unit. Additionally or alternatively, similar graph traversal algorithms such as depth first search, breadth first search and the like may be used for determining the first navigational instructions. In an embodiment, multi-agent visual navigation system 100 may determine the first navigational instructions for each agent of the plurality of agents to reach a corresponding signalling unit closer to the home station or the root signalling unit while ensuring maximal initial coverage of the signalling units by the plurality of agents. In an embodiment, the multi-agent visual navigation system 100 may implement pre-trained machine learning model to determine first navigational instructions for the plurality of agents to traverse the signalling units.

At step 402, when an agent of the plurality of agents reaches the corresponding signalling unit, the corresponding signalling unit records pass-by information associated with the agent. In an embodiment, the recording of pass-by information associated with the agent includes recording of pass-by event of the agent and receiving path information associated with the agent at the corresponding signalling unit. In an embodiment, the corresponding signalling unit may obtain the pass-by information associated with the agent through radio communication as the agent approaches the corresponding signalling unit. The recording of pass-by event of the agent includes capturing agent identity (ID) from the agent, and recording time-stamp for the agent upon reaching the corresponding signalling unit. The agent may be provided with a smart label such as Radio-Frequency Identification (RFID) tag, which may be read by the agent ID sensor 306 of the corresponding signalling unit. The path information associated with the agent may include at least one of one or more previously traversed signalling units by the agent, previously received navigational instructions, details of designated signalling unit, and time-stamps associated with one or more previously traversed signalling units by the agent. Receiving pass-by information associated with the agent may be performed at each of the corresponding signalling units to which the agent is guided.

The path information associated with the agent provides navigational history of the agent to the corresponding signalling unit. The one or more previously traversed signalling units may include one or more signalling units already traversed by the agent before reaching the corresponding signalling unit. The time-stamp for traversal of the one or more previously traversed signalling units by the agent may be received at the corresponding signalling unit. The designated signalling unit may include the details of the corresponding signalling unit where the agent is guided to reach in accordance with the first and/or second navigational instructions. This information allows the multi-agent visual navigation system 100 to verify whether the agent has reached the corresponding signalling unit as designated. In some embodiments, the path information associated with the agent received at the corresponding signalling unit may include the previously received navigational instructions and other backup information received by the agent from the one or more previously traversed signalling units. In this way, the agent will act as signal receiver as well as data transmitter for the signalling units 104, In cases, where the agent is traversing to the corresponding signalling unit from a root signalling unit or home station, the previously traversed signalling unit may be recorded as root signalling unit along with the time-stamp of initiation of navigation. In such embodiment, the previously received navigational instructions and the backup information received by the agent from the previously traversed signalling unit would be null.

At step 403, the multi-agent visual navigation system 100 may determine second navigational instructions for an agent to traverse a proximal signalling unit of the signalling units 104. The second navigational instructions will guide each of the plurality of agents 106 to a proximal signalling unit from the current signalling unit. In case of a centralized framework of the multi-agent visual navigation system 100, the pass-by information associated with each agent, recorded at each corresponding signalling unit, may be received by a centralized server for determining second navigational instructions for the plurality of agents. The multi-agent visual navigation system 100 may determine second navigational instructions for the agent based on the pass-by information associated with the agent, the pre-determined proximity information associated with each pair of the corresponding signalling unit, pass-by event recorded at the signalling units and a number of the signalling units.

In case of distributed framework of the multi-agent visual navigation system 100, the pass-by information associated with the agent recorded at the corresponding signalling units and the pre-determined proximity associated with each pair of the signalling units is used by the navigation prediction module to determine second navigational instructions for the agent. The signalling units 104 are communicatively coupled with each other via ad-hoc wireless network. In some embodiments, upon recording the pass-by information associated with the agent, the corresponding signalling unit further obtains from the plurality of other signalling units, pass-by event for the plurality of agents recorded at the one or more signalling units. Accordingly, each signalling unit of the signalling units 104 is configured to obtain aggregated pass-by information associated with the plurality of agents 106 from the other signalling units. The pass-by event for the plurality of agents 106 recorded at the signalling units 104 may include agent ID for each agent of the plurality of agents 106 traversed through the one or more signalling units and the time-stamp of such traversal at the one or more signalling units. The multi-agent visual navigation system 100 may determine second navigational instructions for the agent based on the pass-by information associated with the agent, the pre-determined proximity associated with each pair of the signalling units, pass-by event recorded at the remaining signalling units of the signalling units 104 and number of the signalling units. The pre-determined proximity associated with each pair of the signalling units includes adjacency information associated with the corresponding signalling unit and relative distance of the proximal signalling unit.

The multi-agent visual navigation system 100 may determine second navigational instructions for the agent using pre-trained machine learning model. In some embodiments, the pre-trained machine learning model may include reinforcement learning model. The reinforcement learning model may be trained with multiple iterations for different randomly generated layout in centralized framework as well as distributed framework. The reinforcement learning model is trained in a simulation environment to predict second navigational instructions that maximize coverage of the plurality of agents to untraversed signalling units. The reinforcement learning model is given positive reinforcement if the predicted navigational instructions lead to increased coverage. The reinforcement learning model is negatively reinforced when the predicted navigational instructions lead to repetitive coverage (where one or more agents of the plurality of agents traverse the same path), high chances of collision and if the coverage is not completed.

The second navigational instructions for the agent predicted for the corresponding signalling unit at time instant d can be represented as $$C = F(P, D) \quad (1)$$

Where, F is the function obtained from the pre-trained machine learning model,

P is the pre-determined proximity information associated with each pair of the signalling units and D is the pass-by information associated with the plurality of agents.

The step of determining the second navigational instructions for the agent includes predicting a proximal signalling unit to be traversed by the agent based on the pass-by information associated with the plurality of agents 106 obtained at the signalling units 104 and pre-determined proximity associated with each pair of the signalling units. The pass-by information associated with the plurality of agents 106 obtained at the signalling units 104 includes pass-by information associated with the agent recorded at the corresponding signalling unit and the pass-by event of the agent recorded at the remaining signalling units 104. The prediction of the proximal signalling unit to be traversed by the agent includes, firstly, obtaining the pass-by information associated with the plurality of agents 106 from each of the signalling units 104 and, secondly, identifying one or more signalling units yet to be traversed by the plurality of agents 106. In an embodiment, the prediction of the proximal signalling unit further includes identifying one or more proximal signalling units that are yet to be traversed based on the pre-determined proximity information associated with each pair of the signalling units.

The pass-by information obtained from the signalling units 104 that have not been traversed by any agent of the plurality of agents 106 would be null. The pre-determined proximity information associated with each pair of the signalling units may include local proximity list of each of the signalling units 104. With respect to the corresponding signalling unit, the proximal signalling unit may be determined based on the local proximity list associated with the corresponding signalling unit. The local proximity list associated with the corresponding signalling unit may include adjacency information of the proximal signalling units to the corresponding signalling unit, and relative distance between the corresponding signalling unit and the proximal signalling units. Further, the mechanism of identifying the one or more proximal signalling units yet to be traversed may include identifying one or more signalling units that have been traversed by at least one agent of the plurality of agents and the one or more signalling units that are identified as designated signalling unit for at least one agent of the plurality of agents 106. In some embodiments, where the one or more proximal signalling units to the corresponding signalling unit are already traversed by at least one agent, the navigational prediction module of the corresponding signalling unit may check for untraversed signalling units adjacent to such one or more proximal signalling units.

At step 404, the multi-agent visual navigation system 100 provides the second navigational instructions to the plurality of agents 106 at the corresponding signalling unit for complete coverage of the inspection area 102. The second navigational instructions, navigate the agent from a corresponding signalling unit to a subsequent proximal signalling unit. The complete coverage of the inspection area is estimated upon successful traversal of the one or more proximal signalling units of the signalling units 104 by at least one agent of the plurality of agents 106.

The signalling units 104 act as a communicating node for providing guiding path to each agent of the plurality of agents that traverses through it. As explained earlier, upon reaching the corresponding signalling unit, the pass-by information associated with the agent is recorded therein, and the second navigational instructions are provided at the signalling unit for subsequent navigation of the agent to the proximal signalling unit. The second navigational instructions are determined for each agent of the plurality of agents 106 for every traversal of the signalling units 104. Therefore, with every traversal of the corresponding signalling unit by the agent of the plurality of agents 106, the second navigational instructions provided at the corresponding signalling unit are dynamically determined for the one or more agents respectively.

The corresponding signalling unit, after receiving the pass-by information associated with the agent may provide second navigational instructions displayed as visual instructions to the agent. Based on the display, one or more images of the second navigational instructions are captured by the camera mounted on the agent. The one or more images may include one or more frames that are decoded and processed by the navigation signal processing module of the agent for on-board processing. The method reduces computation at the plurality of agents 106 and can be achieved by an agent with low-processing capability. Further, the second navigational instructions are processed and decoded by the navigation signal processing module of the agent, and then converted into high-level motion commands and low-level motor commands by the motion command generating module and motion controlling module of the agent. As explained above, the high-level motion commands and low-level motor commands control the movement of the agent while navigating the agent from the current signalling unit to the proximal signalling unit. In some embodiments, the agent is configured with collision avoidance techniques known in the art to manage any obstacles in the path while navigating from the current signalling unit to the proximal signalling unit.

In an embodiment, to track the traversal of the one or more signalling units by the plurality of agents 106, a proximity table or a proximity graph may be generated based on the single connected graph for the signalling units 104 in the inspection area 102. With every iteration, the proximity table is updated for every traversal of the signalling units 104 by at least one agent of the plurality of agents 106. The proximity table is compared with the pre-determined proximity associated with each pair of the signalling units, in order to estimate successful and complete coverage of the inspection area. In an another embodiment, the single connected graph may be checked to identify the positon of the signalling units 104 for the proximity graph, wherein, with every traversal of the one or more signalling units, the node representing the one or more signalling units is connected with edges. The proximity graph is verified iteratively for coverage of the isolated and free nodes. Complete coverage of the inspection area is determined when no free or isolated node is left in the proximity graph.

Figure 5:
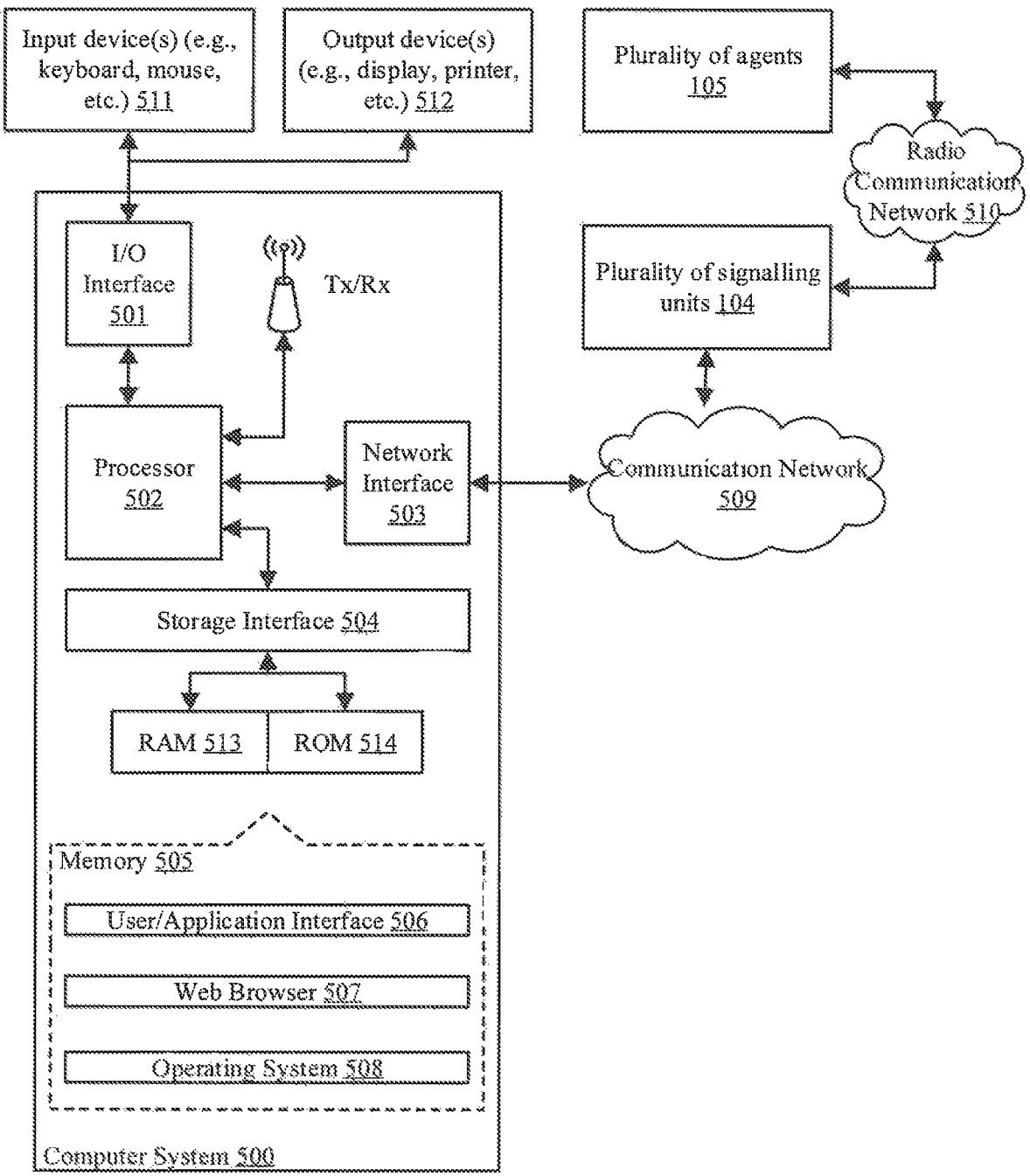
FIG. 5 illustrates a block diagram of an exemplary computer system for implementing embodiments consistent with the present disclosure.

Once the coverage of the inspection area is complete, the signalling units 104 will provide "return" or "back to home" instructions to the plurality of agents 106. The plurality of agents 106 can reach the home station by back tracking the path followed based on the previously received navigational instructions, Once the plurality of agents return to the home station, the collected data stored in the memory of the plurality of agents may be retrieved for further use. In an embodiment, the retrieved data may be used for generating panoramic or 360 or mosaic view of the inspection area, Computer System FIG. 5 illustrates a block diagram of an exemplary computer system 500 for implementing embodiments consistent with the present disclosure. In an embodiment, the computer system 500 may be the multi-agent visual navigation system 100 illustrated in FIG. 1, which may be used for guiding the plurality of agents 105 for complete coverage of the inspection area 102, The computer system 500 may include a central processing unit ("CPU" or "processor") 502. The processor 502 may comprise at least one data processor for executing program components for executing user- or system-generated business processes. A user may include a person, a product quality inspector, a storekeeper, a warehouse manager or any system/sub-system being operated in parallel to the computer system 500. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple. Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. Using the network interface 503 and the communication network 509, the computer system 500 may communicate with the signalling units 104 to receive pass-by information 324 associated with the plurality of agents 105. The signalling units 104 may transmit navigation data 328 to the plurality of agents 105 via radio communication network 510.

In an implementation, the communication network 509 may be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application interface 506, an operating system 507, a web browser 508, and the like. In some embodiments, computer system 500 may store user/application data, such as the data, variables, records, etc. as described in this invention. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE® MACINTOSH® OS X®, UNIX®, UNIX-like system distributions (E. G., BERKELEY SOFTWARE DISTRIBUTION® (BSD), FREEBSD®, NETBSD®, OPENBSD, etc.), LINUX® DISTRIBUTIONS (E. G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 506 may facilitate display, execution, interaction, manipulation, or operation of program components through textual or graphical facilities. For example, the user interface 506 may provide computer interaction interface elements on a display system operatively connected to the computer system 500, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 508 may be a hypertext viewing application. Secure web browsing may be provided using Secure Hypertext Transport Protocol (HTTPS), Secure Sockets Layer (SSL), Transport Layer Security (ITS), and the like. The web browsers 508 may utilize facilities such as AJAX, DHTML, ADOBE® FLASH®, JAVASCRIPT®, JAVA®, Application Programming Interfaces (APIs), and the like. Further, the computer system 500 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the embodiments of the present disclosure are illustrated herein.

In an embodiment, the method of present disclosure helps in avoiding collision between plurality of inspection devices while the plurality of inspection devices are concurrently inspecting an area.

In an embodiment, the method of present disclosure may be used for accurate inspection of the area, since the present disclosure uses plurality of inspection devices, wherein each inspection device is equipped with one or more sensors and image capturing devices for thorough inspection of the area.

In an embodiment, the method of present disclosure significantly reduces the time required for inspecting a large inspection area, since plurality of automated inspection devices are used for inspecting the area.

In an embodiment, the method of present disclosure does not require prior knowledge about dimensions of an area to be inspected. Hence, the method of present disclosure may be used for inspecting a region of any dimension.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may, be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Multi-agent visual navigation system |
| 102 | Inspection area |
| 104 | plurality of signalling units, Signalling units |
| 106 | plurality of agents, agents |
| 108 | Communication network |
| 110 | Network interface |
| 112 | Processor |
| 114 | Memory |
| 200 | Agent |
| 202 | Camera |
| 204 | One or more sensors |
| 206 | Motors |
| 208 | Memory (Agent) |
| 210 | Sensor data capturing module |
| 212 | Navigation signal processing module |
| 214 | Motion command generating module |
| 216 | Motion controlling module |
| 218 | Image logging module |
| 220 | Data (Agent) |
| 222 | Camera and sensor data |
| 224 | Navigation data |
| 226 | Path information |
| 228 | Other data |
| 230 | Network interface (Agent) |
| 300 | Signalling unit |
| 302 | Processor (Signalling unit) |
| 304 | Display (Signalling unit) |
| 306 | Agent ID sensor |
| 308 | Memory (Signalling unit) |
| 310 | Data (Signalling unit) |
| 312 | Proximity-updating module |

-continued

| Reference Number | Description |
| --- | --- |
| 314 | Feedback module |
| 316 | Pass-by information receiving module |
| 318 | Navigation prediction module |
| 320 | Navigation signalling module |
| 322 | Local proximity data (signalling unit) |
| 324 | Pass-by information associated with the plurality of agents |
| 326 | Time-stamp data |
| 328 | Navigation instructions |
| 330 | Network Interface (Signalling unit) |
| 500 | Exemplary computer system |
| 501 | I/O Interface of the exemplary computer system |
| 502 | Processor of the exemplary computer system |
| 503 | Network interface |
| 504 | Storage interface |
| 505 | Memory of the exemplary computer system |
| 506 | User/Application interface |
| 507 | Web browser |
| 508 | Operating system |
| 509 | Communication network |
| 510 | Radio communication network |
| 511 | Input devices |
| 512 | Output devices |
| 513 | RAM |
| 514 | ROM |

We claim:

1. A method of guiding a plurality of agents for complete coverage of an inspection area, where the method comprises:

providing, by a multi-agent visual navigation system, first navigational instructions to the plurality of agents to reach a corresponding signalling unit of a plurality of signalling units associated with the inspection area;

upon reaching the corresponding signalling unit by an agent of the plurality of agents, recording, by the multi-agent visual navigation system, pass-by information associated with the agent at the corresponding signalling unit of the plurality of signalling units, wherein the recording of the pass-by information comprises:

recording of pass-by event of the agent by capturing agent identity (ID) from the agent, and recording a corresponding time-stamp for the agent; and receiving path information associated with the agent at the corresponding signalling unit, wherein the path information comprises at least one of one or more previously traversed signalling units by the agent, previously received navigational instructions, details of designated signalling unit, and time-stamps associated with the one of one or more previously traversed signalling units by the agent;

determining, by the multi-agent visual navigation system, second navigational instructions for the agent of the plurality of agents to traverse a proximal signalling unit of the plurality of signalling units, wherein determining the second navigational instructions for the agent comprises predicting the proximal signalling unit to be traversed by the agent based on pass-by information associated with the plurality of agents obtained at the plurality of signalling units and a pre-determined proximity associated with each pair of the plurality of signalling units; and providing, by the multi-agent visual navigation system, the second navigational instructions to the plurality of agents at the corresponding signalling unit for subsequent traversal of each of the proximal signalling units of the plurality of signalling units by at least one agent of the plurality of agents.

2. The method as claimed in claim 1, wherein the pass-by information associated with the plurality of agents obtained at the corresponding signalling unit comprises the pass-by information associated with the agent recorded at the corresponding signalling unit, pass-by information associated with the plurality of agents obtained from the plurality of signalling units, and time-stamp for each traversal.

3. The method as claimed in claim 1, wherein determining the second navigational instructions for the agent comprises using a pre-trained reinforcement learning model.

4. The method as claimed in claim 1, wherein the pre-determined proximity associated with each pair of the plurality of signalling units comprises adjacency information for each of the plurality of signalling units and relative distance between each pair of the plurality of signalling units.

5. The method as claimed in claim 1, wherein providing the second navigational instructions to the plurality of agents comprises displaying visual instructions at the plurality of signalling units to be captured by the plurality of agents for on-board processing.

6. A multi-agent visual navigation system for guiding a plurality of agents for complete coverage of an inspection area, the multi-agent navigation system comprises:
  a plurality of signalling units configured with display;
  a memory communicatively coupled with at least one processor, storing instructions which on execution causes the processor to:
    provide first navigational instructions to the plurality of agents to reach a corresponding signalling unit of the plurality of signalling units associated with the inspection area;
    record pass-by information associated with an agent at the corresponding signalling unit of the plurality of signalling units upon reaching the corresponding signalling unit by the agent of the plurality of agents, wherein the pass-by information is recorded by:
      recording of pass-by event of the agent by capturing agent identity (ID) from the agent, and recording a corresponding time-stamp for the agent; and
      receiving path information associated with the agent at the corresponding signalling unit, wherein the path information comprises at least one of one or more previously traversed signalling units by the agent, previously received navigational instructions, details of designated signalling unit, and time-stamps associated with the one of one or more previously traversed signalling units by the agent;
    determine second navigational instructions for the agent of the plurality of agents to traverse a proximal signalling unit of the plurality of signalling units for complete coverage of the inspection area,
      wherein determining second navigational instructions for the agent comprises predicting the proximal signalling unit to be traversed by the agent based on pass-by information associated with the plurality of agents obtained at the plurality of signalling units and a pre-determined proximity associated with the plurality of signalling units;
    provide the second navigational instructions to the plurality of agents at the corresponding signalling unit for subsequent traversal of each of the proximal signalling units of the plurality of signalling units by at least one agent of the plurality of agents.

7. The multi-agent visual navigation system as claimed in claim 6, wherein the pass-by information associated with the plurality of agents obtained at the corresponding signalling unit comprises the pass-by information associated with the agent recorded at the corresponding signalling unit, pass-by information associated with the plurality of agents obtained from the plurality of signalling units, and time-stamp for each traversal.

8. The multi-agent visual navigation system as claimed in claim 6, wherein the second navigational instructions for the agent are determined using pre-trained reinforcement learning model.

9. The multi-agent visual navigation system as claimed in claim 6, wherein the pre-determined proximity associated with each pair of the plurality of signalling units comprises adjacency information for each of the plurality of signalling units and relative distance between each pair of the plurality of signalling units.

10. The multi-agent visual navigation system as claimed in claim 6, to provide the second navigational instructions to the plurality of agents, the instructions on execution causes the processor to display visual instructions at the plurality of signalling units to be captured by the plurality of agents for on-board processing.

11. A non-transitory computer readable medium storing processor-executable instructions for:
  providing first navigational instructions to the plurality of agents to reach a corresponding signalling unit of a plurality of signalling units associated with the inspection area;
  upon reaching the corresponding signalling unit by an agent of the plurality of agents, recording pass-by information associated with the agent at the corresponding signalling unit of the plurality of signalling units, wherein the recording of the pass-by information comprises:
    recording of pass-by event of the agent by capturing agent identity (ID) from the agent, and recording a corresponding time-stamp for the agent; and
    receiving path information associated with the agent at the corresponding signalling unit, wherein the path information comprises at least one of one or more previously traversed signalling units by the agent, previously received navigational instructions, details of designated signalling unit, and time-stamps associated with the one of one or more previously traversed signalling units by the agent;
  determining second navigational instructions for the agent of the plurality of agents to traverse a proximal signalling unit of the plurality of signalling units,
    wherein determining the second navigational instructions for the agent comprises predicting the proximal signalling unit to be traversed by the agent based on pass-by information associated with the plurality of agents obtained at the plurality of signalling units and a pre-determined proximity associated with each pair of the plurality of signalling units; and
  providing the second navigational instructions to the plurality of agents at the corresponding signalling unit for subsequent traversal of each of the proximal signalling units of the plurality of signalling units by at least one agent of the plurality of agents.

12. The non-transitory computer readable medium of the claim 11, wherein the pass-by information associated with the plurality of agents obtained at the corresponding signalling unit comprises the pass-by information associated with the agent recorded at the corresponding signalling unit, pass-by information associated with the plurality of agents obtained from the plurality of signalling units, and timestamp for each traversal.

13. The non-transitory computer readable medium of the claim 11, wherein determining the second navigational instructions for the agent comprises using a pre-trained reinforcement learning model.

14. The non-transitory computer readable medium of the claim 11, wherein the pre-determined proximity associated with each pair of the plurality of signalling units comprises adjacency information for each of the plurality of signalling units and relative distance between each pair of the plurality of signalling units.

15. The non-transitory computer readable medium of the claim 11, wherein the processor-executable instructions are further for displaying visual instructions at the plurality of signalling units to be captured by the plurality of agents for on-board processing.

* * * * *